United States Patent [19]
Mackenzie

[11] 4,305,512
[45] Dec. 15, 1981

[54] JAR ORGANIZER AND STORAGE RACK
[76] Inventor: James F. Mackenzie, 321 N. Lakeside Dr., Lake Worth, Fla. 33460
[21] Appl. No.: 93,383
[22] Filed: Nov. 13, 1979
[51] Int. Cl.³ .............................................. A47F 7/28
[52] U.S. Cl. .................................. 211/75; 211/49 D; 312/45
[58] Field of Search ................... 211/49 D, 14, 75, 74; 312/45, 42

[56] References Cited
U.S. PATENT DOCUMENTS

| | | | |
|---|---|---|---|
| 1,125,174 | 1/1915 | Rextren | 211/49 D X |
| 1,664,753 | 4/1928 | Langenfeld | 312/45 |
| 1,930,321 | 10/1933 | Ogden | 312/45 |
| 2,221,704 | 11/1940 | Farley | 211/14 X |
| 3,018,001 | 1/1962 | Combs | 211/49 D |
| 3,497,118 | 2/1970 | Najjar | 211/14 X |

*Primary Examiner*—Frazier Roy D.
*Assistant Examiner*—Robert W. Gibson, Jr.
*Attorney, Agent, or Firm*—Malin & Haley

[57] ABSTRACT

An organizer and storage rack for small canned or jarred commodities, such as foodstuffs, which allows for convenient manual dispensing of a particular individual jar. The storage rack may be vertically mounted on a door or wall structure and includes one or more cylindrical chambers having large and small slotted wall portions disposed along one particular peripheral area. The cylinders are mounted to a flat, planar surface and include partially closed portions along the bottom of the cylinder. The larger and smaller slots through the cylinder wall allows for manual grasping of a small jar or container disposed therein in stacked form for selection of the desired jar to be removed such that the fingers can manipulate the jar to a recessed area for its convenient removal. The device is especially useful for baby food jars.

1 Claim, 5 Drawing Figures

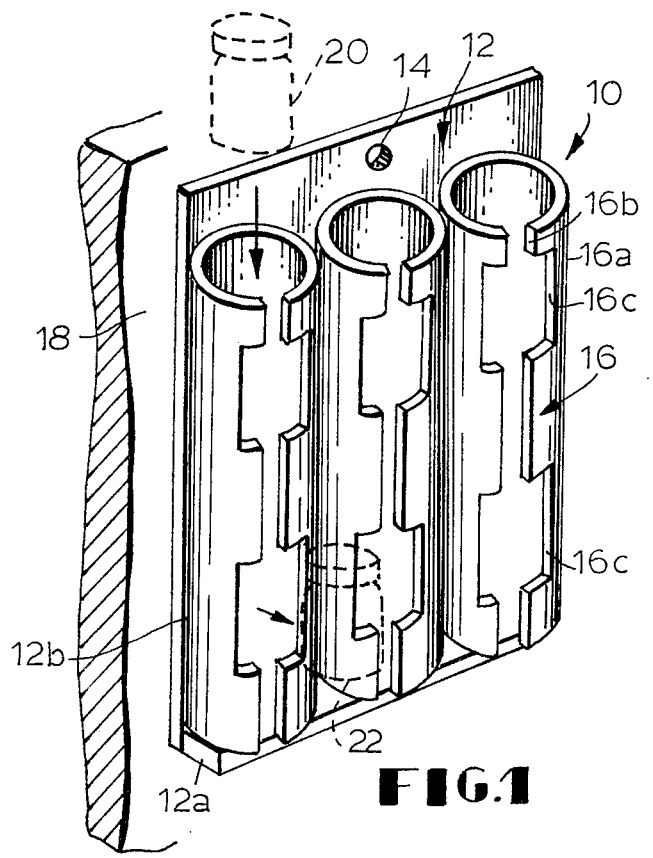
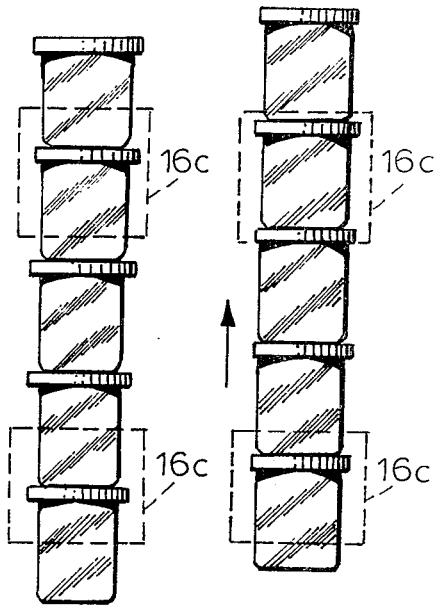
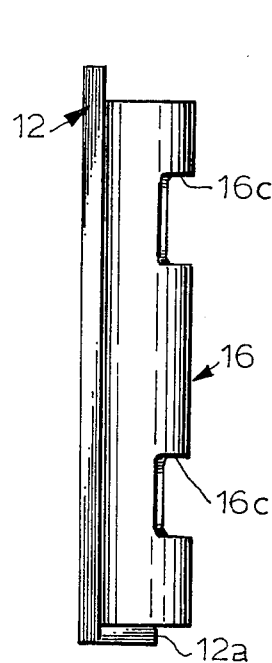
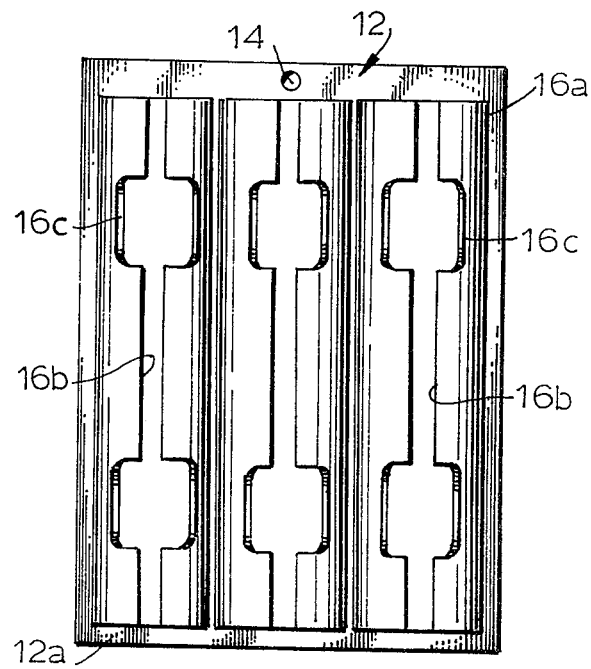
FIG.1  FIG.4  FIG.5  FIG.2  FIG.3

JAR ORGANIZER AND STORAGE RACK

BACKGROUND OF THE INVENTION

This invention relates to a device for storing in an organized, but quickly removable form, stacked jars of commodities, such as foodstuff and especially baby foods.

The utilization of baby food jars, which are somewhat small and yet have a variety of different foods, require storage of large amounts of jars. A conventional cupboard is not suited for such storage because the jars are often randomly housed therein and require hunting and searching through each jar for the selection of a particular foodstuff.

The present invention provides for organized storage of the jars in stacked arrays with the label clearly visible as to the foodstuff contained therein, while in its stored posture, for ease of removal from the stacked array of any particular commodity in the array. The storage device may be mounted on a door or wall surface for access by the user.

BRIEF DESCRIPTION OF THE INVENTION

A storage device for small canned or jarred commodities which may be used for manually dispensing of a predetermined can or jar comprising a flat, planar mounting surface, at least one hollow cylinder mounted along one peripheral edge to said flat planar surface, each of said cylinders including a longitudinally disposed slot along one peripheral area, the slot having a smaller spaced portion for allowing a finger-sized width and a larger slotted portion adjacent the smaller slotted portion, the larger portion being sufficient to withdraw a stacked container within the cylinder therethrough, and a closure connected to the bottom surface of said cylinder for supporting a stacked array of cans or jars within the cylinder.

In one preferred embodiment, a plurality of cylinders are mounted in parallel, vertically (longitudinal axis) and side-by-side to a flat sheet. The flat sheet itself may include suitable fasteners such as screws or other wall hanging means for mounting the entire flat, planar surface vertically on a door or wall. The slotted portions of each cylinder are facing outward substantially at 180 degree position on the cylinder relative to the attachment of the cylinder to the flat, planar surface.

The cylinder vertical height may be as desired. The cylinder body includes a plurality of larger and smaller slots such that a slot runs along the entire cylinder facing outwardly which permits the fingers of the user to be directed inwardly into each cylinder.

In operation, each cylinder will have a stacked array of cans or jars such that through the slotted portions, the labels on the cans or jars are visible to the user. When it is desired to retract a particular container from the storage rack, the user merely grasps through the slotted portions the desired container, and by lifting the stacked array to a position exposing the nearest larger recess or slot, the user may then retract the desired jar or can.

It is an object of this invention to provide an improved storage rack which may be door or wall mounted vertically for storing small containers of commodities such as cans or jars of food.

It is another object of this invention to provide a storage rack that may be easily and quickly and nonexpensively manufactured and which allows for the organization and efficient dispensing and selection of particular commodity jars or cans from a stored array.

In accordance with these and other objects which will be apparent hereinafter, the instant invention will now be described with particular reference to the accompanying drawings.

BRIEF DESCRIPTION OF THE DRAWINGS

FIG. 1 shows a perspective view of one embodiment of the present invention mounted on a vertical surface with a dotted can or jar showing its entry and its withdrawal.

FIG. 2 shows a side elevational view of the device shown in FIG. 1.

FIG. 3 shows a front elevational view of the present invention.

FIG. 4 and FIG. 5 show a schematic diagram using dotted portions representing the larger slots of the present invention to show the manipulation and movement of a stacked array of jars or cans for withdrawal.

PREFERRED EMBODIMENT OF THE INVENTION

Referring now to the drawings and specifically FIG. 1, the present invention is shown generally at 10 comprised of a rigid planar surface 12 having an L-shaped lip 12a along its bottom edge, the surface including an aperture 14 for receiving a fastener to allow the surface 12 to be mounted vertically on a wall or door surface 18.

Attached to the rigid surface 12 are a plurality of hollow cylinders 16, each of which is supported at its bottom end on the lip 12a of rigid surface 12. Each surface has a longitudinal peripheral slot running from one end to the other end. The slot has variations in width which are discussed in greater detail below. Essentially, there are first areas of the longitudinal slot 16b which are sized to allow the fingers of the user to pass therethrough. The second areas of slots are substantially wider and are sized to allow a small jar or can to pass therethrough from the inside of the cylinder to the outside. The lip 12a is also sized to allow free space at the bottom of each cylinder so that the fingers of the user can contact the bottom-most jar to allow the entire stacked array of jars to be moved upwardly.

In operation, the device is suitable for storing a plurality of vertically stacked jars or cans with their labels facing outwardly so that the user can visually observe what particular type of commodity is contained in each jar. The jars are placed downwardly through the open top of each cylinder and remain in this posture until the user desires to select a particular jar. FIGS. 4 and 5 show manipulation of an array of jars such that the desired jar to be removed is aligned with the front widened slot 16c and upon alignment it can be removed through the front of the cylinder.

FIG. 2 shows a side view of the cylinder, and especially the bottom lip 12a is shown not extending across the full bottom of the cylinder. This opening allows the fingers to be received underneath the bottom-most jar or can for raising the entire column.

FIG. 3 shows the forward slots 16b and 16c disposed in the cylinder body 16a.

The device may be constructed economically such that the cylinders may be constructed of conventional PVC tubing. Each cylinder may then be mounted on a plastic or wood plate adhesively or by other means.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A storage rack for commodities and containers such as jars or cans that is mountable on a movable or stationary vertical surface, to prevent accidental removal of a container, the storage rack comprising:

a flat rigid, planar mounting surface;

at least one hollow cylindrically shaped support member for supportably storing one or more stacked containers in a vertical column, said support member being substantially tangentially mounted to said flat mounting surface such that the support member longitudinal axis is parallel to the mounting surface, and the support member is mounted on one side of said planar mounting surface, said support member having a longitudinally disposed peripheral slot on the side opposite the tangential connection of said support member to said mounting surface, said slot having narrow segments and wide segments longitudinally disposed in successive arrays, said narrow segments being sized to receive the fingers of a user but not large enough to permit a container to pass therethrough, and the wide segments being sized to permit removal through said segment slots of a container disposed within the support member, said cylindrical support member having a top opening and a bottom opening, and a narrow slot segment commencing from the bottom opening; and a flat surface connected over a partial portion of the bottom end of said support member such that the narrow slotted segment and the adjacent portion of the bottom end opening remains open, whereby the narrow slot segment at the bottom opening prevents the bottom most container supported on the bottom surface from accidental removal in that the bottom of the container must be raised from a rest position on the bottom surface to the first wide slot for removal.

* * * * *